United States Patent
Osogami (10) Patent No.: US 11,823,083 B2
(45) Date of Patent: Nov. 21, 2023

(54) N-STEPS-AHEAD PREDICTION BASED ON DISCOUNTED SUM OF M-TH ORDER DIFFERENCES

(71) Applicant: INTERNATIONAL BUSINESS MACHINES CORPORATION, Armonk, NY (US)

(72) Inventor: Takayuki Osogami, Yamato (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 715 days.

(21) Appl. No.: 16/677,771

(22) Filed: Nov. 8, 2019

(65) Prior Publication Data

US 2021/0142195 A1    May 13, 2021

(51) Int. Cl.
*G06N 7/00* (2023.01)
*G06N 20/00* (2019.01)

(52) U.S. Cl.
CPC .............. *G06N 7/00* (2013.01); *G06N 20/00* (2019.01)

(58) Field of Classification Search
CPC ................................. G06N 20/00; G06N 7/00
See application file for complete search history.

(56) References Cited

U.S. PATENT DOCUMENTS

| | | | |
|---|---|---|---|
| 9,811,781 B2 | 11/2017 | Ariyoshi et al. | |
| 2003/0126103 A1* | 7/2003 | Chen | G06Q 10/08 706/50 |
| 2006/0025931 A1* | 2/2006 | Rosen | G16H 50/20 702/19 |
| 2006/0217939 A1 | 9/2006 | Nakata et al. | |
| 2009/0248403 A1* | 10/2009 | Kinoshita | H04S 7/305 704/219 |
| 2011/0106011 A1* | 5/2011 | Cinar | G16H 40/67 604/151 |
| 2016/0246919 A1* | 8/2016 | Wang | G06Q 10/04 |
| 2018/0012137 A1 | 1/2018 | Wright et al. | |
| 2018/0175790 A1* | 6/2018 | Sanfilippo | H02J 3/38 |
| 2018/0211181 A1* | 7/2018 | Lei | G06V 10/7715 |
| 2019/0316802 A1* | 10/2019 | Alanqar | F24F 11/64 |
| 2020/0000373 A1* | 1/2020 | Agrawal | A61B 5/7267 |
| 2020/0370771 A1* | 11/2020 | Alanqar | F24F 11/65 |
| 2020/0371482 A1* | 11/2020 | Alanqar | F24F 11/46 |
| 2021/0018205 A1* | 1/2021 | Ellis | F24F 11/47 |
| 2021/0165852 A1* | 6/2021 | Granger | G05B 13/027 |

OTHER PUBLICATIONS

Pan, et al., "Accelerated Gradient Temporal Difference Learning", Proceedings of the 31st AAAI Conference on Artificial Intelligence, Feb. 2017, pp. 2462-2470.

(Continued)

*Primary Examiner* — Nicholas Augustine
(74) *Attorney, Agent, or Firm* — Tutunjian & Bitetto, P.C.; Peter Edwards (57) ABSTRACT

An n-steps-ahead value of time-series data is estimated by a prediction model configured to output a sum of discounted m-th order differences of adjacent time steps at each time step, wherein an m-th order difference at a corresponding time step is discounted by using a discount factor such that an m-th order difference discount increases as a time step of the m-th order difference increases.

19 Claims, 5 Drawing Sheets

(56) References Cited

OTHER PUBLICATIONS

Mann, et al., "Adaptive Least-Squares Temporal Difference Learning", Dec. 2016, 7 pages.
Boyan, "Technical Update: Least-Squares Temporal Difference Learning", Machine Learning, vol. 49, Nov. 2002, pp. 233-246.
Zhong, et al., "Efficient Reinforcement Learning in Continuous State and Action Spaces with Dyna and Policy Approximation", Frontiers of Computer Science, vol. 13, Issue 1, Feb. 2019, pp. 106-126.
Van Seijen, et al., "True Online Temporal-Difference Learning", Journal of Machine Learning Research, vol. 17, Aug. 2016, 40 pages.
Hyndman, et al., "Automatic Time Series Forecasting: the Forecast Package for R", MONASH University Dept of Econometrics and Business Statistics, Jun. 2007, 31 pages.
"Introduction to ARIMA Models", https://people.duke.edu/~rnau/411arim.htm, Jul. 16, 2019, 5 pages.
Boateng, "Time Series Analysis Methods: Building Arima Models for Forecasting", https://rstudio-pubs-static.s3.amazonaws.com/303786_f1b99d6b7e9346c4b1488a174bab839a.html, Jul. 2019, 49 pages.
List of IBM Patents or Patent Applications Treated as Related dated Nov. 7, 2019, 2 pages.

* cited by examiner

N-STEPS-AHEAD PREDICTION BASED ON DISCOUNTED SUM OF M-TH ORDER DIFFERENCES

BACKGROUND

The present invention relates to n-steps-ahead prediction, and more specifically, to n-steps-ahead prediction based on discounted sum of m-th order differences.

Time-series data in noisy environments, such as the temperature in a machine and the water level at a river, which are obtained from sensors, often involves large variance. It is sometimes difficult to predict future values (e.g., a value after 5 days) of the time-series data involving large variance.

SUMMARY

According to an aspect of the present invention, a computer-implemented method is provided for n-steps-ahead (n>1) prediction of time-series values. The method includes obtaining a target data for which an n-steps-ahead value is predicted; processing the target data using a prediction model to estimate an n-steps-ahead value by using an output of the prediction model, wherein the prediction model has been configured through training to output a sum of discounted m-th order differences of adjacent time steps at each time step and wherein an m-th order difference at a corresponding time step has been discounted by using a discount factor such that an m-th order difference discount increases as a time step of the m-th order difference increases.

According to another aspect of the present invention, a computer-implemented method is provided for n-steps-ahead (n>1) prediction of time-series values. The method includes training a prediction model to output a sum of discounted m-th order differences of adjacent time steps at each time step, wherein an m-th order difference at a corresponding time step is discounted by using a discount factor such that an m-th order difference discount increases as a time step of the m-th order difference increases, and estimating an n-steps-ahead value by using an output of the prediction model.

The foregoing aspect can also include an apparatus configured to perform the computer-implemented method, and a computer program product storing instructions embodied on a computer-readable medium or programmable circuitry, that, when executed by a processor or the programmable circuitry, cause the processor or the programmable circuitry to perform the method. The summary clause does not necessarily describe all features of the embodiments of the present invention. Embodiments of the present invention can also include sub-combinations of the features described above.

DETAILED DESCRIPTION

Hereinafter, example embodiments of the present invention will be described. The example embodiments shall not limit the invention according to the claims, and the combinations of the features described in the embodiments are not necessarily essential to the invention.

Figure 1:
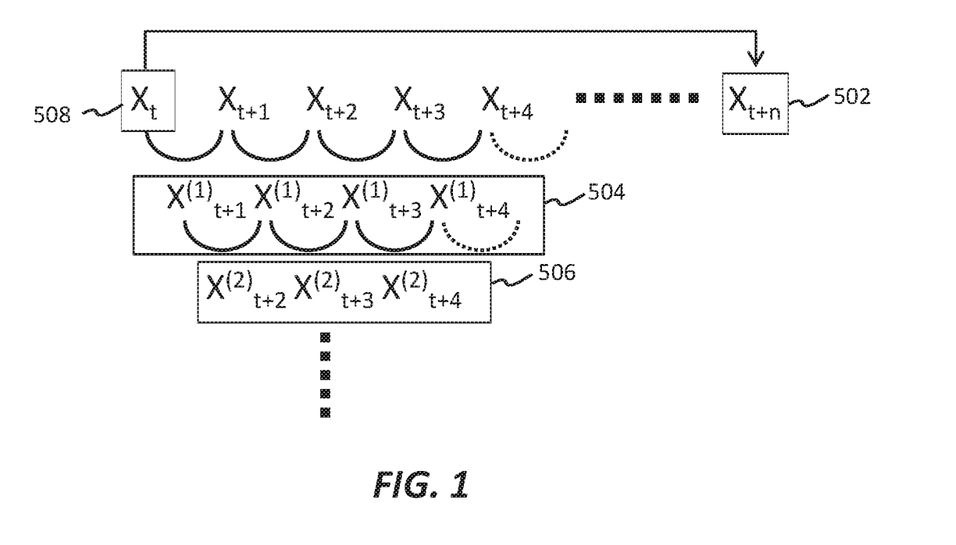
FIG. 1 shows an n-steps-ahead value and m-th order differences, according to an embodiment of the present invention.

FIG. 1 shows an n-steps-ahead value and m-th order differences, according to an embodiment of the present invention. $X_t, X_{t+1}, X_{t+2}, \ldots, X_{t+n}$ in FIG. 1 represent time-series values, such as time-series values from a sensor, at time steps $t, t+1, t+2, \ldots, t+n$, respectively. $X_{t+n}$ 502 is an n-steps-ahead value in relation to $X_t$ 508 in the time-series values. $X^{(1)}_{t+1}, X^{(1)}_{t+2}, X^{(1)}_{t+3} \ldots$ 504 in FIG. 1 represent 1st order differences of $X_t, X_{t+1}, X_{t+2}, \ldots, X_{t+n}$. For example, $X^{(1)}_{t+1}$ is equal to $X_{t+1} - X_t$, and $X^{(1)}_{t+2}$ is equal to $X_{t+2} - X_{t+1}$. $X^{(2)}_{t+2}, X^{(2)}_{t+3}, X^{(2)}_{t+4} \ldots$ 506 in FIG. 1 represent 2nd order differences of $X^{(1)}_{t+1}, X^{(1)}_{t+2}, X^{(1)}_{t+3}, X^{(1)}_{t+4} \ldots$. For example, $X^{(2)}_{t+2}$ is equal to $X^{(1)}_{t+2} - X^{(1)}_{t+1}$, and $X^{(2)}_{t+3}$ is equal to $X^{(1)}_{t+3} - X^{(1)}_{t+2}$.

Figure 2:
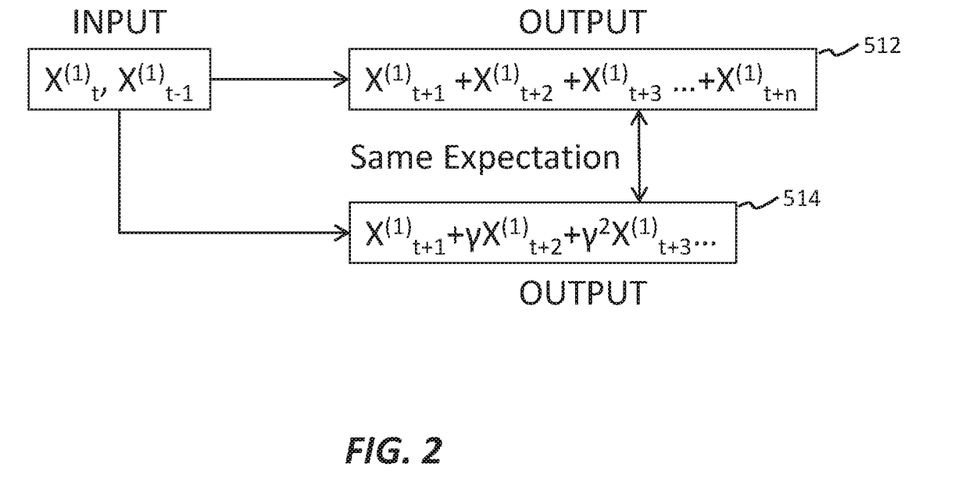
FIG. 2 shows a prediction model according to an embodiment of the present invention.

FIG. 2 shows a prediction model according to an embodiment of the present invention. An n-steps-ahead value can be calculated by using a sum of m-th order differences. For example, n-steps-ahead value $X_{t+n}$ is calculated by $X_t + X^{(1)}_{t+1} + X^{(1)}_{t+2} + X^{(1)}_{t+3} \ldots + X^{(1)}_{t+n}$. In another example, n-steps-ahead value $X_{t+n}$ is calculated by $X_t + nX^{(1)}_{t+1} + (n-1)X^{(2)}_{t+2} + (n-2)X^{(2)}_{t+3} \ldots + X^{(2)}_{t+n}$. In a generalized form, n-steps-ahead value $X_{t+n}$ is represented by:

$$\Sigma_{k=0}^{m-1} \binom{n+k-1}{k} X_t^{(k)} + \Sigma_{l=0}^{n} \binom{n+m-l-1}{m-1} X_{t+l}^{(m)}. \quad (1)$$

For example, some prediction models 512 can output a value of $X^{(1)}_{t+1} + X^{(1)}_{t+2} + X^{(1)}_{t+3} \ldots + X^{(1)}_{t+n}$ in a naïve manner. However, such prediction models 512 can suffer from a large variance of time-series data.

On the other hand, a prediction model 514 according to an embodiment of the present invention can output a value of $X^{(1)}_{t+1} + \gamma X^{(1)}_{t+2} + \gamma 2 X^{(1)}_{t+3} \ldots$ (or $\Sigma_{l=1}^{\infty} \gamma^{l-1} X_{t+1}^{(1)}$) instead of $$X_{t+2}^{(l)} + X_{t+3}^{(l)} \ldots + X_{t+n}^{(l)} \left( \text{or } \Sigma_{l=0}^{n} \binom{n+m-l-1}{m-1} X_{t+l}^{(m)} \right).$$

An expectation of $(X^{(1)}_{t+1} + X^{(1)}_{t+1} + X^{(1)}_{t+3} \ldots + X^{(1)}_{t+n})$ of prediction model 512 and an expectation of $(X^{(1)}_{t+1} + \gamma X^{(1)}_{t+2} + \gamma^2 X^{(1)}_{t+3} \ldots)$ of prediction model 514 is both $nE[X^{(1)}i]$ when $\gamma$ is $1-1/n$. Since a value of $(X^{(1)}_{t+1} + \gamma X^{(1)}_{t+2} + \gamma^2 X^{(1)}_{t+3} \ldots)$ converges to a certain value, a problem of variance can be overcome by the prediction model according to one or more embodiments of the present invention.

In a generalized form, an expectation of $(X^{(m)}_{t+1} + X^{(m)}_{t+2} + X^{(m)}_{t+3} \ldots + X^{(m)}_{t+n})$ is calculated as $$E\left[ \Sigma_{l=0}^{n} \binom{n+m-l-1}{m-1} X_{t+l}^{(m)} \right],$$

while an expectation of $(X^{(m)}_{t+1}+\gamma X^{(m)}_{t+2}+\gamma^2 X^{(m)}_{t+3}\ldots)$ is calculated as $$E\left[\frac{1}{n}\binom{n-l+m}{m}\Sigma_{l=1}^{\infty}\gamma^{l-1}X^{(m)}_{t+l}\right]$$

where $\gamma$ can be $1-1/n$. Given that $E[X^{(m)}_t]=\mu^{(m)}$ for every time step t, which can be approximately satisfied in practice, both expectations are the same. Therefore, adaptation of $(X^{(m)}_{t+1}+\gamma X^{(m)}_{t+2}+\gamma^2 X^{(m)}_{t+3}\ldots)$ instead of $(X^{(m)}_{t+1}+X^{(m)}_{t+2}+X^{(m)}_{t+3}\ldots+X^{(m)}_{t+n})$ in the prediction model can only bring low variance with low or no bias.

Figure 3:
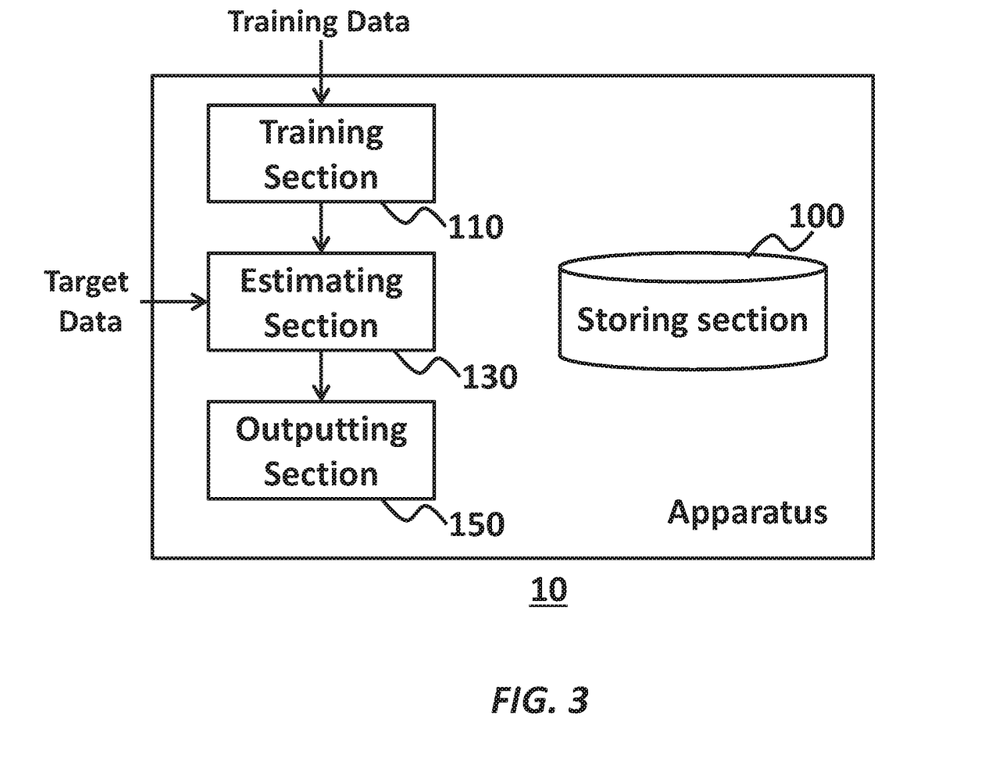
FIG. 3 shows an exemplary configuration of an apparatus 10, according to an embodiment of the present invention.

FIG. 3 shows an exemplary configuration of an apparatus 10, according to an embodiment of the present invention. The apparatus 10 can train a prediction model having a low variance, used for n-steps-ahead (n>1) prediction of time-series values. Thereby, the apparatus 10 can enable prediction of time-series values, especially with a large variance, much faster and/or with less computational resources.

The apparatus 10 can include a processor and/or programmable circuitry. The apparatus 10 can further include one or more computer readable mediums collectively including instructions. The instructions can be embodied on the computer readable medium and/or the programmable circuitry. The instructions, when executed by the processor or the programmable circuitry, can cause the processor or the programmable circuitry to operate as a plurality of operating sections.

Thereby, the apparatus 10 can be regarded as including a storing section 100, a training section 110, an estimating section 130 and an outputting section 150.

The storing section 100 stores information used for the processing that the apparatus 10 performs. The storing section 100 can also store a variety of data/instructions used for operations of the apparatus 10.

One or more other elements in the apparatus 10 (e.g., the training section 110, the estimating section 130, and the outputting section 150) can communicate data directly or via the storing section 100, as necessary.

The storing section 100 can be implemented by a volatile or non-volatile memory of the apparatus 10. In some embodiments, the storing section 100 can store training data, prediction models, and other parameters and data related thereto.

The training section 110 can train a prediction model to output a sum of discounted m-th order differences of adjacent time steps at each time step. In the sum of discounted m-th order differences of adjacent time steps, an m-th order difference at a corresponding time step is discounted by using a discount factor such that an m-th order difference discount increases as a time step of the m-th order difference increases.

The training section 110 can train the prediction model that inputs at least one m-th order difference observed by a current time step. In an embodiment, the training section 110 can train the prediction model that inputs m-th order differences of a current time step and a last time step. In an embodiment, the m-th order difference is a first order difference. The training section 110 can train the prediction model to output the sum of discounted m-th order differences of adjacent time steps at each time step from a subsequent time step to an infinite future time step.

For example, the training section 110 can train the prediction model as shown in FIG. 2, where m is 1, and the discount factor is $\gamma$. Input of the prediction model is a 1st order difference $X^{(1)}_t$ of a current time step t and a 1st order difference $X^{(1)}_{t-1}$ of a last time step t−1 in FIG. 2. A sum of discounted m-th order differences of adjacent time steps at time step t can be $(X^{(1)}_{t+1}+\gamma X^{(1)}_{t+2}+\gamma^2 X^{(1)}_{t+3}\ldots)$ in FIG. 2. The training section 110 can provide the estimating section 130 with the trained prediction model.

The estimating section 130 can estimate an n-steps-ahead value by using an output of the prediction model. In an embodiment, the estimating section 130 can estimate a sum of discounted m-th order differences of adjacent time steps at time step t' $(X^{(1)}_{t'+1}+\gamma X^{(1)}_{t'+2}+\gamma^2 X^{(1)}_{t'+3}\ldots)$ by inputting at least $X^{(1)}_{t'}$ and $X^{(1)}_{t'-1}$ into the prediction model. Then the estimating section 130 can calculate $X_{t'}+(X^{(1)}_{t'+1}+\gamma X^{(1)}_{t'+2}+\gamma^2 X^{(1)}_{t'+3}\ldots)$ to obtain $X_{t'+n}$ as an n-steps-ahead value for a current value $X_{t'}$ by using the output of the prediction model. The estimating section 130 can provide the estimated n-steps-ahead value with the outputting section 150.

The outputting section 150 can output the estimated n-steps-ahead value. In an embodiment, the outputting section 150 can display the n-steps-ahead value on a screen of the apparatus 10 or transmit the n-steps-ahead value to another apparatus.

According to FIG. 3, the training section 110, the estimating section 130, and the outputting section 150 are equipped in a single entity (e.g., the apparatus 10). In other embodiments, these sections are separately equipped in multiple entities (e.g., two apparatuses). For example, a first apparatus can include the training section 110 while a second apparatus can include the estimating section 130 and the outputting section 150.

Figure 4:
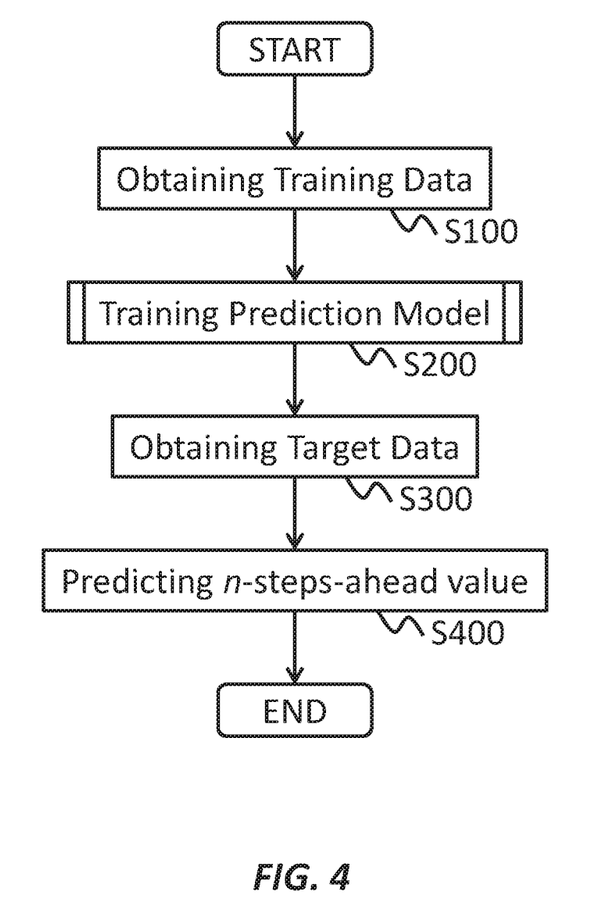
FIG. 4 shows an operational flow according to an embodiment of the present invention.

FIG. 4 shows an operational flow according to an embodiment of the present invention. The present embodiment describes an example in which an apparatus, such as the apparatus 10, performs operations from S100 to S400, as shown in FIG. 4, to train a prediction model and to estimate an n-steps-ahead value using the trained prediction model.

At S100, a training section, such as the training section 110, can obtain training data used for training of a prediction model.

Figure 5:
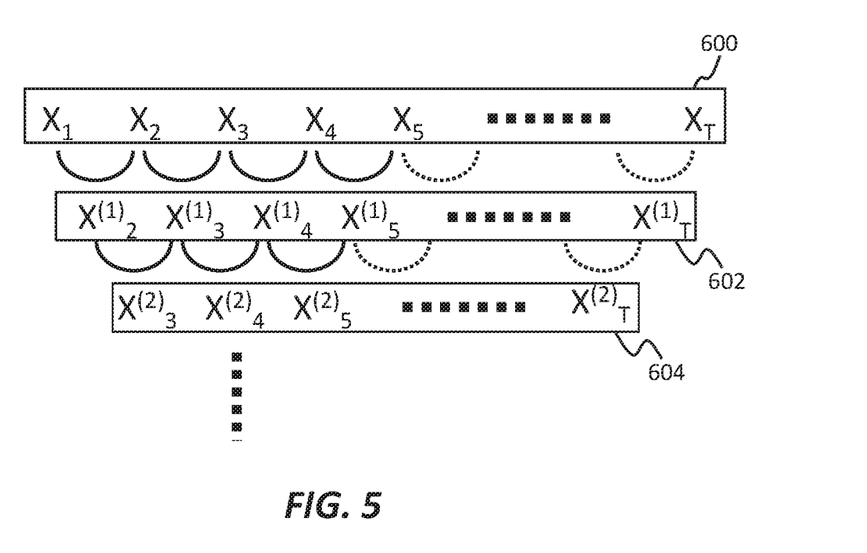
FIG. 5 shows training data according to an embodiment of the present invention.

FIG. 5 shows training data 600 according to an embodiment of the present invention. The training section can obtain time-series values $X_1, X_2, \ldots, X_T$ at time steps 1, 2, 3, ..., T as training data 600. T represents the number of values of the time-series data.

The training section 110 can calculate m-th order differences of adjacent time steps at each time step 1 ... T from the training data 600. A parameter m is preliminarily selected from an integer. In an embodiment, the training section 110 can calculate 1st order differences $X^{(1)}_2$, $X^{(1)}_3, \ldots, X^{(1)}_T$ 602 from $X_1, X_2, \ldots, X_T$ 600. In an embodiment, the training section 110 can calculate 2nd order differences $X^{(2)}_3, X^{(2)}_4, \ldots, X^{(2)}_T$ 604 from $X^{(1)}_2$, $X^{(1)}_3, \ldots, X^{(1)}_T$ 602.

Here, a sum of discounted m-th order differences of adjacent time steps at time step $(X^{(m)}_{t+1}+\gamma X^{(m)}_{t+2}+\gamma^2 X^{(m)}_{t+3}\ldots)$ includes values from a subsequent time step t+1 to an infinite future time step t+∞. However, the training section can generate only a sum of discounted m-th order differences of adjacent time steps at time step from a subsequent time step t+1 to a "finite" future time step T.

Therefore, the training section 110 can approximate an infinite sum $(X^{(m)}_{t+1}+\gamma X^{(m)}_{t+2}+\gamma^2 X^{(m)}_{t+3}\ldots)$ from a finite sum of discounted m-th order differences. In an embodiment, the training section 110 can generate the sum of discounted m-th order differences of adjacent time steps at each time step from the subsequent time step to the infinite future time step, from observed values of finite time steps in the training data by recurrently defining the sum of discounted m-th order differences.

For example, the sum of discounted m-th order differences of adjacent time steps at each time step t can be defined by using $Y^{(m)}_{t+1}$ as:

$$Y^{(m)}_{t+1} = X^{(m)}_{t+1} + \gamma X^{(m)}_{t+2} + \gamma^2 X^{(m)}_{t+3} + \gamma^3 X^{(m)}_{t+4} + \ldots \quad (2), \text{ and}$$

$$Y^{(m)}_{t+1} = X^{(m)}_{t+1} + \gamma X^{(m)}_{t+2} + \gamma^2 Y^{(m)}_{t+3} \quad (3).$$

In an assumption that $Y^{(m)}_{t+1}$ and $Y^{(m)}_{t+3}$ are expected to be the same value $Y^{(m)}$, $Y^{(m)}$ is shown as following:

$$(1-\gamma^2) Y^{(m)}_{t+1} = X^{(m)}_{t+1} + \gamma X^{(m)}_{t+2}, \text{ and} \quad (4)$$

$$Y^{(m)}_{t+1} = \frac{1}{(1-\gamma^2)} (X^{(m)}_{t+1} + \gamma X^{(m)}_{t+2}). \quad (5)$$

In an embodiment, the training section 110 can calculate $Y^{(m)}_{t+1}$ from the m-th order differences of adjacent time steps at each time step 1 . . . T. In another embodiment, the training section 110 can calculate $Y^{(m)}_{t+1}$ by using a following formula (6) in a similar manner where L is greater than 2 by an integer value:

$$Y^{(m)}_{t+1} = \frac{1}{(1-\gamma^L)} \Sigma_{l=1}^{L} (\gamma^{l-1} X^{(m)}_{t+l}). \quad (6)$$

In another embodiment, the training section 110 can calculate $Y^{(m)}_{t+1}$ at each time step 1 . . . T by using a following equation (8):

$$Y^{(m)}_{t+1} = \Sigma_{l=1}^{T-t} \gamma^{l-1} X^{(m)}_{t+1} \quad (8).$$

In an embodiment, the discount factor can have a positive correlation with n. In a specific embodiment, the discount factor can be set to 1-1/n. In another embodiment, the discount factor can be set to a value close to 1-1/n.

At S200, the training section 110 can train a prediction model by using a sum of discounted m-th order differences of adjacent time steps derived from the training data at S100. In an embodiment, the training section 110 can train a prediction model such that the prediction model inputs m-th order differences of a current time step and a last time step $(X^{(m)}_t, X^{(m)}_{t-1})$ and outputs the sum of discounted m-th order differences of adjacent time steps at each time step from a subsequent time step to an infinite future time step. In a generalized form, the training section 110 can train the prediction model to output:

$$\Sigma_{l=1}^{\infty} \gamma^{l-1} X^{(m)}_{t+1} \quad (9),$$

In an embodiment, the training section 110 can use $Y^{(m)}_{t+1}$ calculated at S100 as an objective variable of the prediction model. In the embodiment, the training section 110 can train the prediction model using at least the m-th order differences $(X^{(m)}_t, X^{(m)}_{t-1})$ of the current time step t and the last time step t-1, and the obtained objective variable $(Y^{(m)}_{t+1})$.

The training section 110 can perform the training of the prediction model by utilizing a linear prediction model. In an embodiment, the training section 110 can utilize a Least Squares Temporal Difference (LSTD) prediction model (e.g., LSTD($\lambda$)) for training the prediction model. In another embodiment, the training section 110 can perform the training of the prediction model by utilizing a Temporal Difference (TD) prediction model (e.g., TD(0), TD(1), TD(n), TD($\lambda$)), or a Monte Carlo model.

Figure 6:
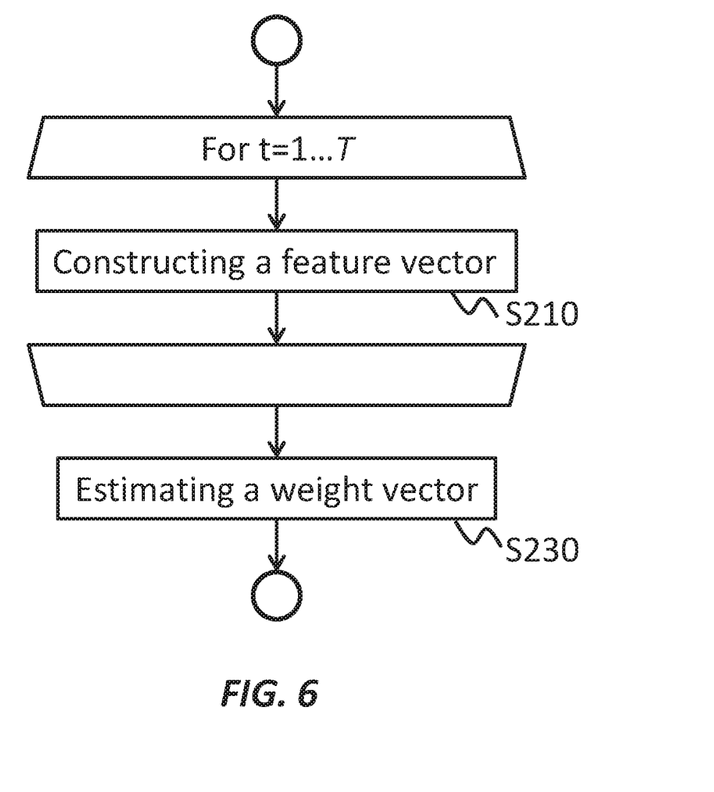
FIG. 6 shows a sub-flow of S200 in FIG. 4 according to an embodiment of the present invention.

FIG. 6 shows a sub-flow of S200 in FIG. 4 according to an embodiment of the present invention. The training section 110 can perform the operation of S200 by using the linear prediction model with operations of S210-S230 shown in FIG. 6. In the embodiment of FIG. 6, the training section 110 can perform the training by using LSTD($\lambda$).

At S210, the training section 110 can construct a feature vector φt for each t=1 . . . T. In an embodiment, the training section 110 can construct the feature vector φt by φt=($X^{(m)}t$, X(m)t-1, a), where a can be a hyper parameter and typically be 1.

At S230, the training section 110 can estimate a weight vector θ of a linear model $f_\theta$ by $A_T^{-1} b_T$, where $$A_T = \Sigma_{t=0}^{T-1} \varphi_t (\varphi_t - (1-\lambda)\gamma \Sigma_{l=1}^{T-t-1} (\lambda\gamma)^{l-1} \varphi_{t+1} - \gamma(\lambda\gamma)^{T-t-1} \varphi_T)^T \quad (10), \text{ and}$$

$$b_T = \Sigma_{t=0}^{T-1} \varphi_t \Sigma_{l=1}^{T-t} (\lambda\gamma)^{l-1} X_{t+1}^{(m)} \quad (11),$$

where $\lambda$ is a parameter of LSTD($\lambda$) preliminary set to be in a range of $0<\lambda<1$.

At S300, an estimating section, such as the estimating section 130, can obtain target data, for which an n-steps-ahead value is predicted. In an embodiment, the estimating section 130 can obtain time-series values $X_{t'}$ at time step t' as target data. In an embodiment, the estimating section 130 can further obtain at least a part of preceding time-series values $X_{t'-1}, X_{t'-2}, \ldots$ at time steps t'-1, t'-2, . . . as the target data.

The estimating section 130 can calculate m-th order differences of adjacent time steps at each time step t', t'-1, . . . The estimating section 130 can calculate m-th order differences of adjacent time steps for all m necessary to predict the n-steps-ahead value.

The estimating section 130 can calculate m-th order differences $X^{(m)}_{t'-1}$ and $X^{(m)}_{t'}$ from the target data. In an embodiment, the training section 110 can calculate 1st order differences $X^{(1)}_{t'-1}$ and $X^{(1)}_{t'}$ from $X_{t'-2}, X_{t'-1}$, and $X_{t'}$. In an embodiment, the estimating section 130 can construct a feature vector $\varphi_{t'} = (X^{(m)}_{t'}, X^{(m)}_{t'-1}, a)$ from the m-th order differences $(X^{(m)}_{t'}, X^{(m)}_{t'-1})$ of adjacent time steps in a manner similar or identical to the manner explained in relation to S210.

At S400, the estimating section 130 can estimate the n-steps-ahead value by calculating output of the prediction model trained at S200 by inputting the m-th order differences of adjacent time steps calculated at S300. The estimating section 130 can obtain a sum of discounted m-th order differences of adjacent time steps $\Sigma_{l=1}^{\infty} \gamma^{l-1} X^{(m)}_{t'+l}$ for time step t' as output of the prediction model. The estimating section 130 can estimate future values of a variety of data (e.g., temperature in a machine, water level at a river, and, data from financial markets) by using the prediction model.

In an embodiment, the estimating section 130 can calculate a product of θ estimated at S230 and $\varphi_{t'}$, constructed at S300 to obtain a sum of discounted m-th order differences of adjacent time steps $\Sigma_{l=1}^{\infty} \gamma^{l-1} X^{(m)}_{t'+l}$.

Then, the estimating section can calculate:

$$\Sigma_{k=0}^{m-1} \binom{n+k-1}{k} X^{(k)}_{t'} + \frac{1}{n} \binom{n-1+m}{m} \theta^T \phi'_t, \quad (12)$$

as the n-steps-ahead value for time step t'.

In the embodiments above, the training section 110 can train the prediction model to output the sum of discounted m-th order differences of adjacent time steps at each time step from a subsequent time step to an "infinite" future time step. In other embodiments, the training section 110 can train the prediction model to output the sum of discounted m-th order differences of adjacent time steps at each time step from a subsequent time step to a "finite" future time step.

The training section 110 can train the prediction model that outputs:

$$\frac{1}{n}\binom{n-1+m}{m}\Sigma_{l=1}^{N}\gamma^{l-1}X_{t+l}^{(m)}, \qquad (13)$$

where $\Sigma_{l=1}^{N}\gamma^{l-1}X_{t+l}^{(m)}$ represents the sum of discounted m-th order differences of adjacent time steps at each time step from a subsequent time step to a "finite" future time step N, and N can be set in relation to n of n-steps-ahead prediction. In an embodiment, the finite future time step is within 5n steps from a current time step, and in this case N<=5n (e.g., N can be set to be 3n).

In an embodiment, the training section 110 can generate an objective variable $Y^{(m)}_{t+1}$ by a following equation (14) from the training data $X_1, X_2, \ldots, X_T$ at S100:

$$Y^{(m)}_{t+1}=X^{(m)}_{t+1}+\gamma X^{(m)}_{t+2}+\gamma^2 X^{(m)}_{t+3}+\ldots\gamma^{N-1}X^{(m)}_{t+N} \qquad (14).$$

Then, the training section 110 can train the prediction model to output $Y^{(m)}_{t+1}$ defined in the equation (14) at S200 in response to input of a feature vector φt at time step t. In an embodiment, the training section 110 can estimate a weight vector θ for minimizing a mean squared error, at S230, by:

$$\theta^*=\mathrm{argmin}_\theta \Sigma_t(\theta^T\varphi_t-y_t)^2 \qquad (15).$$

In the embodiment, the training section 110 can calculate the weight vector θ* to give the minimized squared error by:

$$\theta^*=(\Sigma_t\varphi_t\varphi_T)^{-1}(\Sigma_t y_t\varphi_t) \qquad (16).$$

In the embodiments of finite future time steps, the sum of discounted m-th order differences of adjacent time steps does not include an end portion of time step N+1 to an infinite future time step. Therefore, in these embodiments, the training section 110 can train the prediction model so as to reduce bias of the prediction model due to the end portion.

Various embodiments of the present invention can be described with reference to flowcharts and block diagrams whose blocks can represent (1) steps of processes in which operations are performed or (2) sections of apparatuses responsible for performing operations. Certain steps and sections can be implemented by dedicated circuitry, programmable circuitry supplied with computer-readable instructions stored on computer-readable media, and/or processors supplied with computer-readable instructions stored on computer-readable media. Dedicated circuitry can include digital and/or analog hardware circuits and can include integrated circuits (IC) and/or discrete circuits. Programmable circuitry can include reconfigurable hardware circuits having logical AND, OR, XOR, NAND, NOR, and other logical operations, flip-flops, registers, memory elements, etc., such as field-programmable gate arrays (FPGA), programmable logic arrays (PLA), etc.

The present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server.

In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which includes one or more executable instructions for implementing the specified logical function(s).

In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 7:
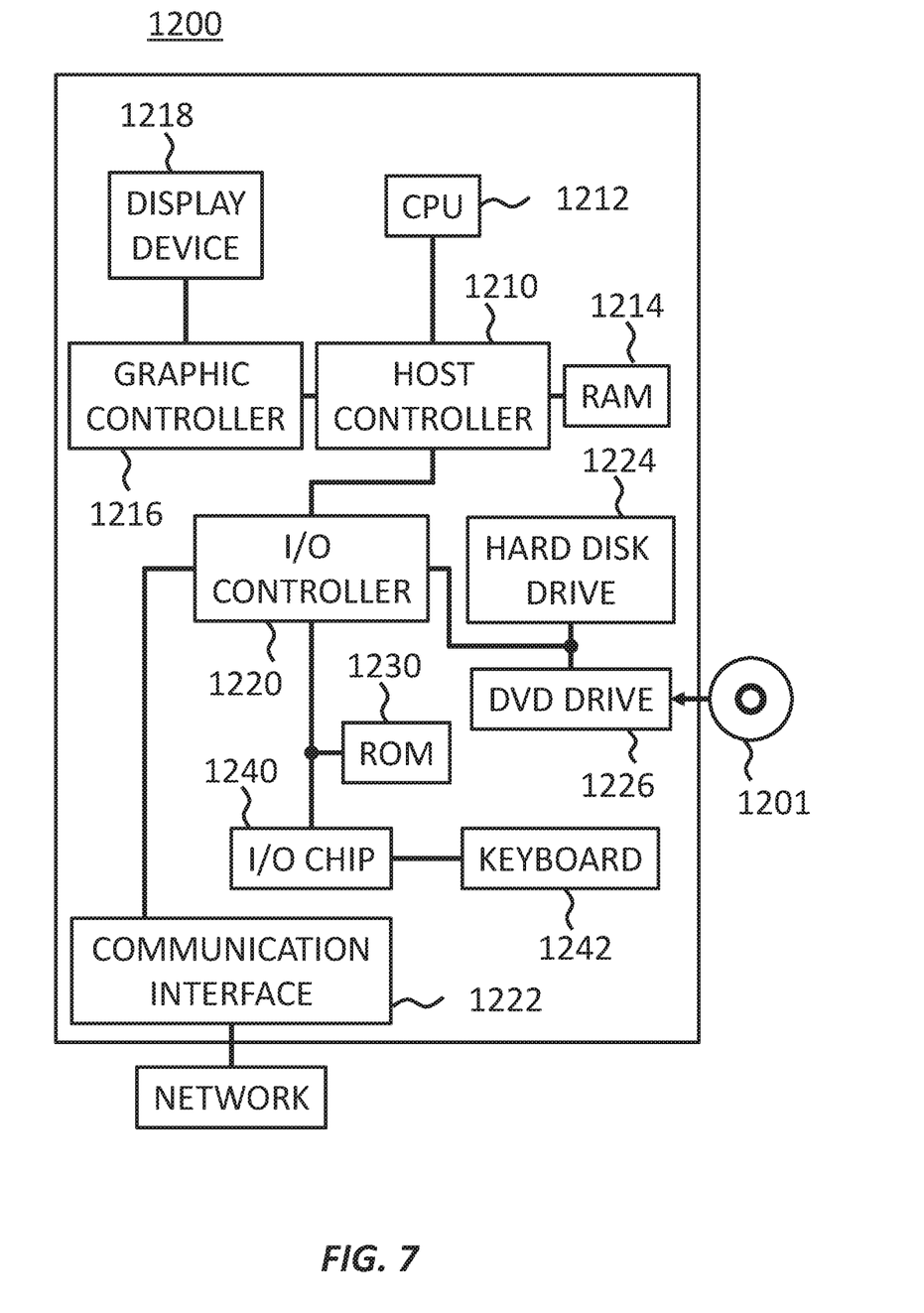
FIG. 7 shows an exemplary hardware configuration of a computer that functions as a system, according to an embodiment of the present invention.

FIG. 7 shows an example of a computer 1200 in which aspects of the present invention can be wholly or partly embodied. A program that is installed in the computer 1200 can cause the computer 1200 to function as or perform operations associated with apparatuses of the embodiments of the present invention or one or more sections thereof, and/or cause the computer 1200 to perform processes of the embodiments of the present invention or steps thereof. Such a program can be executed by the CPU 1212 to cause the computer 1200 to perform certain operations associated with some or all of the blocks of flowcharts and block diagrams described herein.

The computer 1200 according to the present embodiment includes a CPU 1212, a RAM 1214, a graphics controller 1216, and a display device 1218, which are mutually connected by a host controller 1210. The computer 1200 also includes input/output units such as a communication interface 1222, a hard disk drive 1224, a DVD-ROM drive 1226 and an IC card drive, which are connected to the host controller 1210 via an input/output controller 1220. The computer also includes legacy input/output units such as a ROM 1230 and a keyboard 1242, which are connected to the input/output controller 1220 through an input/output chip 1240.

The CPU 1212 operates according to programs stored in the ROM 1230 and the RAM 1214, thereby controlling each unit. The graphics controller 1216 obtains image data generated by the CPU 1212 on a frame buffer or the like provided in the RAM 1214 or in itself, and causes the image data to be displayed on the display device 1218.

The communication interface 1222 communicates with other electronic devices via a network. The hard disk drive 1224 stores programs and data used by the CPU 1212 within the computer 1200. The DVD-ROM drive 1226 reads the programs or the data from the DVD-ROM 1201, and provides the hard disk drive 1224 with the programs or the data via the RAM 1214. The IC card drive reads programs and data from an IC card, and/or writes programs and data into the IC card.

The ROM 1230 stores therein a boot program or the like executed by the computer 1200 at the time of activation, and/or a program depending on the hardware of the computer 1200. The input/output chip 1240 can also connect various input/output units via a parallel port, a serial port, a keyboard port, a mouse port, and the like to the input/output controller 1220.

A program is provided by computer readable media such as the DVD-ROM 1201 or the IC card. The program is read from the computer readable media, installed into the hard disk drive 1224, RAM 1214, or ROM 1230, which are also examples of computer readable media, and executed by the CPU 1212. The information processing described in these programs is read into the computer 1200, resulting in cooperation between a program and the above-mentioned various types of hardware resources. An apparatus or method can be constituted by realizing the operation or processing of information in accordance with the usage of the computer 1200.

For example, when communication is performed between the computer 1200 and an external device, the CPU 1212 can execute a communication program loaded onto the RAM 1214 to instruct communication processing to the communication interface 1222, based on the processing described in the communication program. The communication interface 1222, under control of the CPU 1212, reads transmission data stored on a transmission buffering region provided in a recording medium such as the RAM 1214, the hard disk drive 1224, the DVD-ROM 1201, or the IC card, and transmits the read transmission data to a network or writes reception data received from a network to a reception buffering region or the like provided on the recording medium.

In addition, the CPU 1212 can cause all or a necessary portion of a file or a database to be read into the RAM 1214, the file or the database having been stored in an external recording medium such as the hard disk drive 1224, the DVD-ROM drive 1226 (DVD-ROM 1201), the IC card, etc., and perform various types of processing on the data on the RAM 1214. The CPU 1212 can then write back the processed data to the external recording medium.

Various types of information, such as various types of programs, data, tables, and databases, can be stored in the recording medium to undergo information processing. The CPU 1212 can perform various types of processing on the data read from the RAM 1214, which includes various types of operations, processing of information, condition judging, conditional branch, unconditional branch, search/replace of information, etc., as described throughout this disclosure and designated by an instruction sequence of programs, and writes the result back to the RAM 1214. In addition, the CPU 1212 can search for information in a file, a database, etc., in the recording medium. For example, when a plurality of entries, each having an attribute value of a first attribute associated with an attribute value of a second attribute, are stored in the recording medium, the CPU 1212 can search for an entry matching the condition whose attribute value of the first attribute is designated, from among the plurality of entries, and read the attribute value of the second attribute stored in the entry, thereby obtaining the attribute value of the second attribute associated with the first attribute satisfying the predetermined condition.

The above-explained program or software modules can be stored in the computer readable media on or near the computer 1200. In addition, a recording medium such as a hard disk or a RAM provided in a server system connected to a dedicated communication network or the Internet can be used as the computer readable media, thereby providing the program to the computer 1200 via the network.

While the embodiments of the present invention have been described, the technical scope of the invention is not limited to the above described embodiments. It will be apparent to persons skilled in the art that various alterations and improvements can be added to the above-described embodiments. It should also apparent from the scope of the claims that the embodiments added with such alterations or improvements are within the technical scope of the invention.

Many of the embodiments of the present invention include artificial intelligence, machine learning, and model training in particular. A model usually starts as a configuration of random values. Such untrained models must be trained before they can be reasonably expected to perform a function with success. Many of the processes described herein are for the purpose of training a model for n-steps-ahead prediction based on discounted sum of m-th order differences. Once trained, a model can be used for n-steps-ahead prediction, and may not require further training. In this way, a trained n-steps-ahead prediction model is a product of the process of training an untrained model.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. A computer-implemented method for n-steps-ahead (n>1) prediction of time-series values, comprising:
   obtaining a target data for which an n-steps-ahead value is predicted;
   processing the target data using a prediction model to estimate an n-steps-ahead value by using an output of the prediction model, wherein the prediction model has been configured through training to output a sum of discounted m-th order pairwise differences of the time-series values of adjacent time steps at each time step from a subsequent time step to an infinite future time steps as an objective variable, from observed values of finite time steps in training data by recurrently defining the sum of discounted m-th order differences, and wherein an m-th order pairwise difference at a corresponding time step has been discounted by using a discount factor such that an m-th order difference discount increases as a time step of the m-th order difference increases, and
   training the prediction model using at least the m-th order differences of a current time step and a last time step, and a generated objective variable.

2. The method of claim 1, wherein the prediction model inputs at least one m-th order pairwise difference observed by a current time step.

3. The method of claim 1, wherein the discount factor has a positive correlation, with n.

4. The method of claim 1, wherein the discount factor is set to 1-1/n.

5. The method of claim 1, wherein the m-th order pairwise difference is a first order difference.

6. The method of claim 2, wherein the prediction model has been configured to output the sum of discounted m-th order differences of the time-series values of adjacent time steps at each time step from a subsequent time step to an infinite future time step.

7. The method of claim 2, wherein the prediction model has been configured to output the sum of discounted m-th order differences of the time-series values of adjacent time steps at each time step from a subsequent time step to a finite future time step.

8. The method of claim 7, wherein the finite future time step is within 5n steps from a current time step.

9. The method of claim 1, wherein the prediction model utilizes linear prediction model.

10. The method of claim 1, wherein the prediction model utilizes a Least Squares Temporal Difference (lSTD) prediction model.

11. An apparatus for n-steps-ahead (n>1) prediction of time-series values, comprising
   a processor or a programmable circuitry; and
   one or more computer readable mediums collectively including instructions that, when executed by the processor or the programmable circuitry, cause the processor or the programmable circuitry to perform operations including:
   obtaining a target data for which an n-steps-ahead value is predicted;
   processing the target data using a prediction model to estimate an n-steps-ahead value by using an output of the prediction model, wherein the prediction model has been configured through training to output a sum of discounted m-th order pairwise differences of the time-series values of adjacent time steps at each time step from a subsequent time step to an infinite future time steps as an objective variable, from observed values of finite time steps in training data by recurrently defining the sum of discounted m-th order differences, and wherein an m-th order pairwise difference at a corresponding time step has been discounted by using a discount factor such that an m-th order difference discount increases as a time step of the m-th order pairwise difference increases, and training the prediction model using at least the m-th order differences of a current time step, and a last time step, and a generated objective variable.

12. The apparatus of claim 11, wherein the prediction model inputs at least one m-th order pairwise difference observed by a current time step.

13. The apparatus of claim 11, wherein the discount factor has a positive correlation with n.

14. The apparatus of claim 11, wherein the discount factor is set to 1-1/n.

15. The apparatus of claim 11, wherein the m-th order pairwise difference is a first order difference.

16. A computer program product for n-steps-ahead (n>1) prediction of time-series values including one or more computer readable storage mediums collectively storing program instructions that are executable by a processor or programmable circuitry to cause the processor or programmable circuitry to perform operations comprising:

obtaining a target data for which an n-steps-ahead value is predicted;

processing the target data using a prediction model to estimate an n-steps-ahead value by using an output of the prediction model, wherein the prediction model has been configured through training to output a sum of discounted m-th order differences of the time-series values of adjacent time steps at each time step from a subsequent time step to an infinite future time steps an objective variable, from observed values of finite time steps in training data by recurrently defining the sum of discounted m-th order differences, and wherein an m-th order difference at a corresponding time step has been discounted by using a discount factor such that an m-th order difference discount increases as a time step of the m-th order difference increases, and training the prediction model using at least the m-th order differences of a current time step and a last time step, and a generated objective variable.

17. The computer program product of claim 16, wherein the prediction model inputs at least one m-th order pairwise difference observed by a current time step.

18. The computer program product of claim 16, wherein the discount factor has a positive correlation with n.

19. The computer program product of claim 16, wherein the discount factor set to 1-1/n.

* * * * *